United States Patent
Rakestraw (10) Patent No.: US 6,447,722 B1
(45) Date of Patent: Sep. 10, 2002

(54) SOLID WATER TREATMENT COMPOSITION AND METHODS OF PREPARATION AND USE

(75) Inventor: Lawrence F. Rakestraw, Glencoe, MO (US)

(73) Assignee: Stellar Technology Company, St. Louis, MO (US)

( * ) Notice: Subject to any disclaimer, the term of this patent is extended or adjusted under 35 U.S.C. 154(b) by 0 days.

(21) Appl. No.: 09/205,168

(22) Filed: Dec. 4, 1998

(51) Int. Cl.[7] .............................. A61L 2/00; B01D 11/02
(52) U.S. Cl. .................... 422/37; 210/753; 210/754; 252/186.2; 252/186.25; 252/186.34; 252/186.35; 422/1; 422/261
(58) Field of Search .............................. 422/37, 1, 261; 210/753, 754; 252/186.2, 186.25, 186.34, 186.35, 187.34

(56) References Cited

U.S. PATENT DOCUMENTS

| | | |
|---|---|---|
| 3,142,647 A | 7/1964 | Glasgow |
| 3,948,853 A | 4/1976 | Horning et al. |
| 4,149,988 A | 4/1979 | Brennan et al. |
| 4,279,764 A | 7/1981 | Brubaker |
| 4,380,501 A | 4/1983 | Wojtowicz et al. |
| 4,382,799 A | 5/1983 | Davis et al. |
| 4,389,325 A | 6/1983 | Eng et al. |
| 4,444,316 A | 4/1984 | Casberg |
| 4,681,914 A | 7/1987 | Olson et al. |
| 4,710,305 A | 12/1987 | Allison et al. |
| 4,741,858 A | 5/1988 | Choy et al. |
| 4,830,773 A | 5/1989 | Olson |
| 4,867,895 A | 9/1989 | Choy |
| 4,961,751 A | 10/1990 | Eissele et al. |
| 5,213,705 A | 5/1993 | Olson |
| 5,230,903 A | 7/1993 | Ota et al. |
| 5,330,676 A | 7/1994 | Glen |
| 5,464,636 A | 11/1995 | Hight et al. |
| 5,476,670 A | 12/1995 | Hight et al. |
| 5,498,415 A | 3/1996 | Jones |
| 5,527,547 A | 6/1996 | Hight et al. |
| 5,578,559 A | 11/1996 | Dolan et al. |
| 5,591,692 A | 1/1997 | Jones et al. |
| 5,662,940 A | 9/1997 | Hight et al. |
| 5,670,451 A | 9/1997 | Jones et al. |
| 5,688,515 A | 11/1997 | Kuechler et al. |
| 5,750,061 A | 5/1998 | Farina et al. |
| 5,759,441 A | 6/1998 | Tokuoka et al. |
| 5,763,376 A | 6/1998 | Ward et al. |
| 5,814,233 A | 9/1998 | Starkey et al. |
| 6,156,229 A * | 12/2000 | Yang et al. ............... 252/186.1 |

FOREIGN PATENT DOCUMENTS

| | | |
|---|---|---|
| EP | 0 403 465 A1 | 12/1990 |
| WO | WO 92/13528 | 8/1992 |
| WO | WO 93/04987 | 3/1993 |
| WO | WO 96/36224 | 11/1996 |

* cited by examiner

Primary Examiner—Krisanne Thornton
(74) Attorney, Agent, or Firm—Bryan Cave LLP (57) ABSTRACT

The present invention relates generally to novel water treatment compositions and methods of preparation and use. More particularly, the invention relates to solid water treatment compositions containing at least one halogen source and at least one amine compound. Methods of preparing solid water treatment compositions and methods for controlling biofouling, disinfecting, cleaning and water systems are also provided.

35 Claims, 5 Drawing Sheets

SOLID WATER TREATMENT COMPOSITION AND METHODS OF PREPARATION AND USE

BACKGROUND OF THE INVENTION

1. Field of the Invention

The present invention relates generally to water treatment compositions and methods of preparation and use. More particularly, the invention relates to solid water treatment compositions comprising a halogen source and an amine compound, methods of preparing solid water treatment compositions and methods for controlling biofouling, disinfecting, cleaning and water systems.

2. Description of Related Art

A wide variety of water systems are used for hygienic, recreational, commercial and industrial purposes. Typical water systems include cooling towers, swimming pools, spas, decorative fountains, dehumidifiers, waste water treatment systems, air conditioning and refrigeration systems, boiler treatment, desalination, food processing, ground and surface water, industrial effluent, industrial process water, oil field and petroleum processing, paper and pulp processing, septic and sewage treatment, laundry cleaning and sanitation systems, sink sanitizer systems in bars and restaurants, hard surface disinfectant systems in food service areas, disinfectant/sanitizer systems in the brewing industry, disinfectant systems for fruit and vegetable wash, ponds, reservoirs, potable water and toilets. A common problem associated with most types of water systems is contamination of the water by inorganic and organic debris entering the system. Water systems also provide conditions ideal for the growth of many types of microorganisms. Formation of microorganism deposits is known as biofouling and can occur on almost any surface exposed to an aqueous environment. Biofouling causes energy loss from the system due to increased transfer resistance on the system surfaces.

Prior art approaches to controlling biofouling, disinfecting and cleaning water systems include the use of hypohalite such as hypochlorites and hypobromites in various forms and combinations. As used herein, hypohalite refers to any compound that yields hypohalous acid, (HOX) or hypohalite ion (OX species wherein X is halogen when dissolved in water). Generally, a hypohalite source is added to the water to react with and eliminate contaminants. A specific concentration of free available halogen must be established and maintained for effective biofouling control, disinfecting and cleaning.

Hypohalite species disinfect and clean water by reacting with debris and microorganisms that interfere with sanitary conditions in the water. The hypohalite species eliminate the contaminants by chemical oxidation that produces innocuous reaction products. Because there are many types of contaminants that can react with the hypohalite species, many possible reactions can occur and a multitude of by-reaction products are formed. The majority of contaminants, however, comprise various forms of naturally occurring nitrogen compounds. The nitrogen compounds are destroyed by the reaction of the compound with hypohalous acid. The reaction results in the formation of nitrogen, carbon dioxide, water, chlorides and water soluble organic substances. As a result, the water is cleaned and sanitized.

The concentration of the hypohalite species can be determined by several methods and is commonly expressed in terms of parts per million (ppm) of free available halogen, generally chlorine or bromine. The optimum free available halogen concentration varies in a water system depending on the type of system and other environmental factors that must be taken into consideration. Cooling tower water generally requires free and combined available chlorine from about 1.0 to 10 ppm; swimming pools generally require free available chlorine from about 1.0 to 5.0 ppm; spas generally require free available chlorine from about 3.0 to 5.0 ppm; toilet water generally requires free and combined available chlorine from about 2 to 30 ppm; potable water generally requires free and available chlorine from about 2.0 to 3.0 ppm; and cleaning and sanitizing solution generally requires chlorine from about 100 ppm. The amount of free available chlorine or bromine necessary for treating a particular system is well known in the art.

The most economical and widely used source of free available halogen is gaseous chlorine as evidenced by the fact that it is used to disinfect >99% of the public drinking water supplies and >95% of the municipal public swimming pools. Gaseous chlorine is inexpensive and has excellent disinfecting properties. The free chlorine residuals in the water are easy to maintain and monitor throughout the water distribution systems. However, the free chlorine residuals are unstable in bodies of water that are exposed directly to sunlight. The decomposition of the chlorine residuals is due the UV rays. The half-life of the chlorine residuals range from 2–4 hours depending upon the temperature of the water and the intensity of the sunlight. To maintain the optimum free chlorine residual in the water system, gaseous chlorine must be continually fed into the water system to replace the free chlorine lost to UV degradation and reactions involved in the disinfecting of the water. In addition, gaseous chlorine is hazardous and requires a high level of technical expertise to control the gaseous feed system and prevent the release of hazardous amounts to the environment. As a consequence, other halogen sources are preferred over gaseous chlorine in many of the water treatment applications, particularly, residential, small public and private club swimming pools and mid-size cooling water recirculation systems.

Various attempts have been made to develop hypohalite-generating products that overcome the problems associated with gaseous chlorine. One of the most successful product developments has been the compressed forms such as, tablets, pucks, sticks, and the like of trichloroisocyanuric acid (TCCA). TCCA is now widely used to disinfect residential, small public and private club swimming pools. TCCA has significant advantages over other products because it generates cyanuric acid which reduces the degradation of the free chlorine residuals by UV. Also, the free available chlorine content of TCCA is typically 90.5% which is considerably higher (>25%) than other products, except gaseous chlorine which is 100%. In addition, it is easily compressed into solid forms that permit its use in simple low-cost dissolving devices such as erosion feeders, floating feeders and skimmers to chlorinate the water continuously. Moreover, TCCA is safer to use than gaseous chlorine.

Despite TCCA's advantages over other chlorine products, disadvantages remain in its use in some water treatment applications. For instance, TCCA dissolves relatively fast in water. As a result, the concentration of the hypochlorite species in the water systems tend to be high, making the water acidic and corrosive. Additionally, chloramines, which have objectionable odors, are generated. The combination of these properties has prevented TCCA from becoming widely used as a sanitizer in automatic toilet cleaning, spas and indoor swimming pool applications. TCCA can also form nitrogen trichloride, a very hazardous compound that detonates readily when subjected to small mechanical, electrical or thermal shocks. This disadvantage prevents TCCA from becoming widely used in many cooling water treatment applications.

Attempts have been made to develop hypobromite products as an alternative to TCCA and other hypochlorite products. The most successful ones have been bromochlorohydantoins such as 1-bromo, 3-chloro-5,5-dimethyhydantoin (BCDMH) and a composition comprising 60 weight percent 1-bromo-3-chloro-dimethyl hydantoin, 30 weight percent dichloro-dimethyl hydantoin and 10 weight percent 1,3-dichloro-5-ethyl, 5-methyl hydantoin (BCEMH). For example, the BCEMH may comprise 60 weight percent 1-bromo-3-chloro-dimethyl hydantoin, 27.4 weight percent dichloro-dimethyl hydantoin and 10.6 weight percent 1,3-dichloro-5-ethyl, 5-methyl hydantoin and 1 weigh percent sodium chloride. These products are now more widely used in indoor swimming pools, spas, automatic toilet bowl cleaning and mid-size cooling water treatment applications than chlorine products, because they overcome the objectionable chloramine odor associated with chlorine products and are more effective with current alkaline treatment practices for cooling water re-circulation systems. However, the products still are not widely used to disinfect outdoor swimming pools because the free bromine residuals (HOBr and OBr) are degraded very rapidly by UV rays and no suitable means has been devised to slow the degradation process significantly. Moreover, the cost of disinfecting water systems with bromine is at least two times as much as disinfecting with TCCA. In addition, a BCEMH type product has limited application in indoor swimming pools because it dissolves faster than the dominant bromine product, BCDMH.

Thus, TCCA could compete more successfully in the automatic toilet cleaner and water cooling treatment applications if a way is devised to control the dissolving rate of TCCA, reduce the acidity of the TCCA solutions, overcome the chloramine odor and resolve the nitrogen trichloride problem satisfactorily. In addition, BCEMH could compete more successfully with BCDMH if a way is devised to reduce the dissolving rate to a level similar to, or acceptably higher or lower than, that of BCDMH.

Thus, most water treatment compositions are limited in, or precluded from, use in some water treatment applications because of the inherent problems associated with the dissolving rate of the compositions. The halogen source is often the most expensive material used in the composition making the compositions relatively expensive to manufacture. Other attempts to control the optimum free available halogen have concentrated on preserving the hypohalite species after it has already been released into the solution. Thus, none of the prior art attempts have found satisfactory water treatment compositions with dissolving rates appropriate for a particular water system that are both convenient and cost effective to manufacture.

Thus, there is still a need in the art for a composition that can deliver a convenient cost effective water treatment composition with a controlled dissolving rate that is less corrosive to the water system without the undesirable halamine odor associated with compositions of the prior art. Preferably, the composition should be readily customized for a particular type of water system.

SUMMARY OF THE INVENTION

The solid water treatment composition of the invention comprises at least one halogen source and at least one amine compound. In one embodiment, the solid water treatment composition comprises a chlorine or bromine source or a combination thereof and at least one amine compound or combination thereof in a solid form wherein the at least one amine compound reduces the dissolving rate of the halogen source when water treatment composition is immersed in water or other aqueous solution, while maintaining the structural integrity of the solid form. The water treatment composition may further comprise a tabletting additive.

Another aspect of the invention is a method of preparing the water treatment composition. The method provides water treatment compositions wherein at least one halogen source and at least one amine compound react when the solid water treatment composition contacted with water or other aqueous solution.

To further achieve the object of the invention, the invention provides methods of using solid water treatment compositions of the invention for disinfecting, cleaning and controlling biofouling in water systems.

Other features and advantages of the present invention will become apparent from the following description of the invention which refers to the accompanying drawings.

DETAILED DESCRIPTION OF THE INVENTION

The solid water treatment composition of the present invention comprises a halogen source and at least one amine compound. The solid water treatment of the invention may also comprise tabletting additives. Solid forms of the water treatment composition can be blended powders in packages, compressed granules, tablets, pucks, sticks, briquettes, pellets, extrusions, agglomerations, flakes, sheets, cast blocks, compressed blocks and the like.

As used herein, the "at least one halogen source" comprises one or more compound that provides hypohalous acid, HOX or hypohalite ion, OX⁻ species wherein X is halogen when dissolved in water. The halogen source may comprise any halogen or a combination thereof. Halogen ion such as chlorine, bromine, and iodine may be particularly useful. Preferably, the halogen source comprises chlorine or bromine or a combination thereof Representative halogen sources, for example, include trichloroisocyanuric acid (TCCA), dichloroisocyanuric acid (DCCA), monochloroisocyanuric acid, potassium dichloroisocyanuric acid, sodium dichloroisocyanuric acid dihydrate, anhydrous sodium dichloroisocyanuric acid, tribromoisocyanuric acid, dibromoisocyanuric acid, monobromoisocyanuric acid, monobromo-dichlorochloroisocyanuric acid, dibromo-monochloroisocyanuric acid, calcium hypochlorite, lithium hypochlorite, 1,3-dichloro-5,5-dimethylhydantoin (DCDMH), 1,3-dibromo 5,5-dimethylhydantoin, 1-bromo, 3-chloro-5,5-dimethyhydantoin (BCDMH), 1,3-dichloro-5-methyl-5-ethylhydantoin, 1,3-dichloro-5,5-dimethyl-hydantoin, trichloromelamine, tribromomelamine. The at least one halogen source my further comprise a compositions consisting of one mole of trichloroisocyanuric acid and four moles of potassium dichloroisocyanuric acid; compositions comprising sodium bromide and chlorine; compositions comprising a metal bromide and chlorine; compositions comprising trichloroisocyanuric acid and potassium bromide; and compositions comprising about 60% by weight 1-bromo-3-chloro-dimethyl hydantoin, about 30% by weight 1,3 dichloro 5,5 dimethyl hydantoin and about 10% by weight 1,3-dichloro-5-ethyl, 5-methyl hydantoin.

Halogen sources are readily available in commercial form. The most preferred halogen source is TCCA. However, it will be appreciated that the at least one halogen source is not critical, provided that the at least one halogen source yields hypohalite species capable of reacting with the at least one amine compound on or near the surface of the solid composition when the water treatment composition of the present invention is immersed in water.

As used herein, the amine compound can be any compound that has one or more primary amine groups (—$NH_2$) attached to a carbon atom that has amine functionality in the presence of hypohalite. The amine compound can be an aromatic amine, heterocyclic amine, condensed hydrocarbon amine, alkyl amine, organometallic amine and derivatives thereof or combinations thereof. The amine compound should be less soluble than the at least one halogen source. The amine group or groups of the compound must be reactive with hypohalite species produced when the water treatment composition of the present invention comes in contact with water. The amine compound can be substituted or unsubstituted provided that the amine nitrogen atom or atoms of the compound are available to react with hypohalite produced when the water treatment composition comes in contact with water. Preferred amine compounds comprise at least one amine group attached to a carbon atom of a ring structure. More preferred compounds are unhalogenated heterocyclic compounds comprising at least one amine group attached to a carbon atom of the ring structure wherein one or more atoms of the heterocyclic ring(s) is nitrogen, oxygen or sulfur. It is to be appreciated that while the preferred amine compound is unhalogenated, a halogenated compound may be used provided that the compound has amine functionality so that the amine nitrogen reacts with hypohalite species produced when the water treatment composition of the present invention is immersed in water. It is anticipated that combinations and mixtures of amine compounds may be used in the invention. Representative amine compounds are melamine and derivatives thereof, pyrimidine derivatives, piperazine and derivatives thereof, piperidine derivatives, piperidone derivatives, piperazine diones and derivatives thereof, pyridine derivatives, pyridazine and derivatives thereof, napththyridines derivatives, anthracene derivatives, hydantoin derivatives, imidazole derivatives, imidazolidinone derivatives, glycoluril derivatives, oxazolidinone derivatives and combinations or mixtures thereof. Preferred amine compounds comprise from one to three amino groups. The most preferred amine compound is melamine.

The present invention utilizes the amine nitrogen of the amine compound to react with hypohalite when the water treatment composition of the present invention is immersed in water or other aqueous solution. The at least one halogen source yields hypohalite species when the water treatment composition is immersed in water. The hypohalite species then reacts with the at least one amine compound forming halamine compounds on or near the surface of the solid water treatment composition. The resulting halamine reaction products have a dissolving rate slower than the at least one halogen source. The process continues as the halamine compounds dissolve and more at least one halogen source is exposed to the water yielding hypohalite species to react with the amine compound. The process continues until the solid water treatment composition is completely dissolved. Thus, the solid form of the invention maintains its structural integrity while providing an effective amount of halogen species in the water system.

The overall dissolving rate of the water treatment composition of the invention generally will be between the dissolving rate of the at least one halogen source and the amine compound. As a result of the slowed rate of hypohalous acid production, the hypohalous concentration in the water is less than would be obtained from solid forms comprising the at least one halogen source alone, such as TCCA. Further, halamine levels in the water are significantly reduced when the solid water treatment composition is used which in turn reduces objectionable halamine odors associated with using a halogen source alone. In addition, the reductions in the halamine concentration in the water decreases the potential to form hazardous amounts of nitrogen trichloride.

Solution pH levels when the water treatment composition is used generally will be higher than with using a halogen source alone. The amine groups behave like bases and react with hydrohalic acid (e.g., HCl, HBr, etc.) reaction products to form amine halide salts thereby neutralizing the acids and making the solution pH of the water less acidic. The increased solution pH level is less corrosive to components of the water system particularly valves and other mechanical parts which regularly come into contact with the water.

A particular aspect of the invention is the economical manufacture of the solid water treatment composition. Many amine compounds are less costly than typical halogen sources. Tabletting additives can be added to the invention to aid in the economical manufacture and effectiveness of the solid water treatment composition.

As used herein, tabletting additives refer to agents such as bulking agents, dissolution control agents, pH control agents, flocculating agents, chelating agents, corrosion inhibiting agents, internal lubricating agents, hardening agents, non-oxidizing biocides, encapsulating agents, tabletting aids, binders, perfumes, colorants, algaecides, fungicides, and other ingredients known in the art may be added to the water treatment composition of the present invention while maintaining the efficacy of the composition and without destroying the structural integrity of the solid form. The incorporation of additives can significantly decrease the manufacturing costs of the solid water treatment composition. For example, it has been discovered that certain metal salts such as metal sulfates, phosphates, carbonates, fluorides, and selected organic compounds such as cellulose and derivatives thereof, polyethyleneoxide derivatives, polyoxypropylene-polyoxyethylene co-polymer derivatives, carbowax and derivatives thereof, having dissolving rates similar to or less than the halamine reaction products formed by the reaction of the at least one halogen source and the at least one amine compound can be incorporated into the water treatment composition without destroying the structural integrity of the solid form. Calcium sulfate is particularly useful as an additive because significant amounts of expensive halogen source can be replaced with the metal salt while maintaining the efficacy of the solid water treatment composition of the present invention.

The water treatment composition of the invention can be formulated to be used in a wide variety of water system and aqueous media. The concentrations and ratios of the at least one halogen source and amine compound as well as the particle size and distribution will vary according to the system being treated. Any aqueous media or water system that can be treated with hypohalite can be treated with the water treatment composition of the present invention. An advantage of the present invention is that the water treatment composition can be readily formulated to achieve the desired dissolving rate of the at least one halogen source. For example, BCEMH is widely used as an automatic toilet cleaning tablet because it has an acceptable dissolving rate and does not generate objectionable chloramine odors. The use of TCCA products in this application have been limited because TCCA dissolves faster than BCEMH and generates objectionable chloramine odors. However, TCCA can be used in the compositions of the present invention to produce a product that has properties very similar to those of BCEMH by using TCCA in combination with an amine compound such as melamine. Furthermore, BCEMH has not been as widely used in the cooling tower market as BCDMH, because BCEMH dissolves faster than BCDMH. However, combinations of BCEMH and amine compounds such as melamine in the solid water treatment composition of the present invention can produce a product that has properties similar to those of BCDMH. Further, the proper combination of TCCA and amine compounds such as melamine in the solid water treatment composition of the present invention can be used to produce a product having properties similar to BCDMH.

The amount of at least one halogen source contained in the solid water treatment composition will depend on the amount of halogen necessary to treat a particular water system. The halogen source may comprise as little as about 10%. The at least one halogen source generally comprises from about 20% to about 99% by weight of the solid water treatment composition depending on the halogen requirements of the system to be treated. Preferably, the at least one halogen source comprises from about 30% to about 95% by weight of the solid water treatment composition. More preferably the at least one halogen source comprises about 20% to 85% by weight of the solid water treatment composition. For example, the most preferred amount of at least one halogen source is about 70% by weight of the solid water treatment composition when the composition is used to treat toilet water.

The amount of at least one amine compound contained in the solid water treatment composition is dependent on the amount of at least one halogen source and the desired dissolving rate. The at least one amine compound must be in an amount effective to reduce the dissolving rate of the at least one halogen source by reacting with the hypohalite species to form halamine on or near the surface of the solid water treatment composition. The at least one amine compound may be in an amount as little as 1%. The at least one amine compound may comprise from about 1% to about 80% by weight of the solid water treatment composition. Preferably, the amount of at least one amine compound can range from about 10% to about 60% by weight. Most preferably, the amount of at least one amine compound is about 20% by weight when the solid water treatment composition of the present invention is used to treat toilet water.

The amount of at least one tabletting additives will vary depending on the amount of the at least one halogen source and the at least one amine compound used as well as the water system being treated. The amount of can be as much as, or more than 90% by weight of solid water treatment composition. Typical amounts of additives will range from about 5% to about 75% by weight of the solid water treatment composition. Preferably, the amount of additives will range from about 25% to about 75% by weight of solid water treatment composition. More preferably, additives will comprise about 20% by weight of solid water treatment composition. The most preferred tabletting additive for toilets is calcium sulfate.

In a particularly preferred embodiment of the invention useful for cleaning toilet water, the at least one halogen source comprises about 70% by weight, the at least one amine compound comprises about 10% by weight and additives comprise about 20% by weight of the solid water treatment composition. The most preferred embodiment comprises about 70% by weight trichloroisocyanuric acid, about 10% by weight melamine and about 20% by weight calcium sulfate.

The water treatment compositions may be blended powders in packages or may be compressed, cast, agglomerated, extruded or molded into solid forms. As used herein, compacted tablets include, pellets, tablets, pucks, sticks, briquettes or other shapes formed by hydraulic or mechanical pressure sufficient to produce a solid form that maintains is shape. Compressed shapes can be unitary compacted tablets. The solid water treatment composition may also comprise a plurality of discreet granules. The discreet granules may contain at least one halogen source and at least one amine compound. The discreet granules may further comprise at least one tabletting additive. Mixtures of discreet granules may comprise some granules containing at least one halogen source and at least one amine compound but no tabletting additive. The mixture of discreet granules may further comprise granules containing at least one tabletting additive but no halogen source or amine compound.

The weight of the solid form will vary depending on the water treatment system being treated ranging from as little as 0.3 grams to over 800 grams. Generally, the solid water treatment composition tablets will weigh at least about 5 grams. It will be appreciated that different shapes and sizes can be manufactured for the different water treatment applications. For example, a solid form may be about ¼" thick by about ½" in diameter or about 3" thick by 4" in diameter.

The solid water treatment compositions can be made from different particle sizes and by a variety of mixing, granulation and compressing methods. The preferred methods utilizes ingredient-blending techniques wherein the at least one halogen source and the at least one amine compound are combined to form an admixture. The admixture may further comprise at least one tabletting additive. The admixture is compressed into a solid form by applying an effective amount of pressure. Typical pressures used to form compacted solid water treatment composition range from about 5000 to 20,0000 p.s.i.

Preferably, similar size particles of the at least one halogen source and at least one amine compound are used. The at least one halogen source and at least one amine compound of the most preferred methods of producing the water treatment composition of the invention have particles less than 60 mesh U.S. standard screen. For example, when about 99% of the particles are finer than about 60 United States standard mesh screen, the admixture should be granulated into the preferred particle size before molding or forming into the solid water treatment composition of the invention. To form the preferred particle size, the admixture is compressed under sufficient pressure to form a flat solid composition or wafer. The flat solid composition is then broken into particles of between about 10 and 60 mesh. The preferred particle distribution is about 99% greater than about 60 mesh and about 1% no greater than about 12 mesh. Pressure is applied to the admixture effective to form a solid water treatment composition.

Tabletting may be incorporated into the solid water treatment compositions. The preferred method of producing the solid water treatment composition comprising tabletting provides a first portion of the at least one halogen source and at least one amine compound and a second portion comprising tabletting additives. The first and second portions are compressed under an effective amount of pressure to form a first and second flat solid composition. The first and second flat solid compositions are broken into particles having particle distribution about 99% greater than second admixture is produced by admixing the additives separately from the n 60 mesh and about 1% no greater than 12 United States standard screen. The particles are then combined to form the admixture. The admixture may further be compressed under pressure sufficient to maintain a solid form typically from about 5000 to 20,000 p.s.i.

The solid water treatment compositions are used for disinfecting, cleaning and controlling biofouling of a water system. The present invention contemplates that the desired level of the at least one halogen concentration in a particular water system is readily ascertainable by one skilled in the art. The solid water treatment composition can be formulated to treat cooling towers, swimming pools, spas, decorative fountains, dehumidifiers, waste water treatment systems, laundry cleaning and sanitation systems, sink sanitizer systems in bars and restaurants, hard surface disinfectant systems in food service areas, disinfectant/sanitizer systems in the brewing industry, disinfectant systems for fruit and vegetable wash, ponds, reservoirs and toilets. The dissolving rate of the at least one halogen source can be easily controlled by adjusting the ratio of the at least one halogen source and at least one amine compound to slow the dissolving rate of the at least one halogen source to the desired rate for the particular water system being treated.

For example, the optimum free available halogen concentration varies in a water system depending on the type of system and other environmental factors that must be taken into consideration. Cooling tower water generally requires free and combined available chlorine from about 1.0 to 10 ppm; swimming pools generally require free available chlorine from about 1.0 to 5.0 ppm; spas generally require free available chlorine from about 3.0 to 5.0 ppm; toilet water generally requires free and combined available chlorine from about 2 to 30 ppm; potable water generally requires free and available chlorine from about 2.0 to 3.0 ppm; and cleaning and sanitizing solution generally requires chlorine from about 100 ppm. The amount of free available chlorine or bromine necessary for treating a particular system is well known in the art.

The solid water treatment composition of the present invention can be readily formulated to provide the optimum free available halogen concentration. The solid water treatment composition may be introduced into the water of a water system by placing the composition in direct contact with the water. The solid water treatment composition may also be placed in a holding device and then placing the holding device containing the solid water treatment composition into water.

EXAMPLES

The following examples further illustrate the present invention, and are provided as exemplary but not restrictive as to the scope of the invention.

Example 1

Tablets were prepared by the following procedure. The desired portion of the granular ingredients are blended together and the compressed to form a compressed shape having the desired physical properties, e.g. 100 grams, 2.25" in diameter and 1" thick. For tablets having a composition of 79.21 weight percent TCCA, 19.80 weight percent melamine and 0.99 weight percent magnesium stearate, sufficient amounts of the respective ingredients are weighed separately to make tow tablets. Thus, 158.42 grams of TCCA, 39.60 grams of melamine and 1.98 grams of magnesium stearate are weighed separately and added to a glass jar. A lid was screwed on the jar and the ingredients were blended by hand tumbling the ingredients for five minutes. One tablet is made by taking a one hundred gram portion of the blended ingredients in a tablet punch die sets, and then placed in a laboratory hydraulic press where 30 tons of pressure is applied to the punches. The tablet is removed and stored in a sealed polyethylene container.

Example 2

The following procedure was used to customize the TCCA/melamine tablets. The procedure typically involved admixing the halogen source and the amine compounds, compacting the mixture and breaking up the resulting compact to form particles less than ¼". An admixture of the other ingredients was processed in the same manner. The two admixtures were combined and blended by hand by tumbling the ingredients for five minutes. One tablet is made by taking a one hundred gram portion of the blended ingredients in a tablet punch die sets, and then placed in a laboratory hydraulic press where 30 tons of pressure is applied to the punches. The tablet is removed and stored in a sealed polyethylene container.

A tablet composition was made by combining 75.43 weight percent TCCA, 10.78 weight percent melamine, 12.93 weight percent calcium sulfate and 0.86 weight percent magnesium stearate. Two 100 gram tablets were made by admixing 150.86 grams of TCCA with 21.56 grams of melamine by hand tumbling the admixture in a sealed jar for five minutes. The blend was then compressed to form thin wafers about 20 grams each that were then broken up with a mortar and pistil to form particles of <¼". A second admixture was made by combining calcium sulfate and magnesium stearate and processed in the same manner. The two admixtures were combined and processed by the procedure in Example 1.

Example 3

Figure 1:
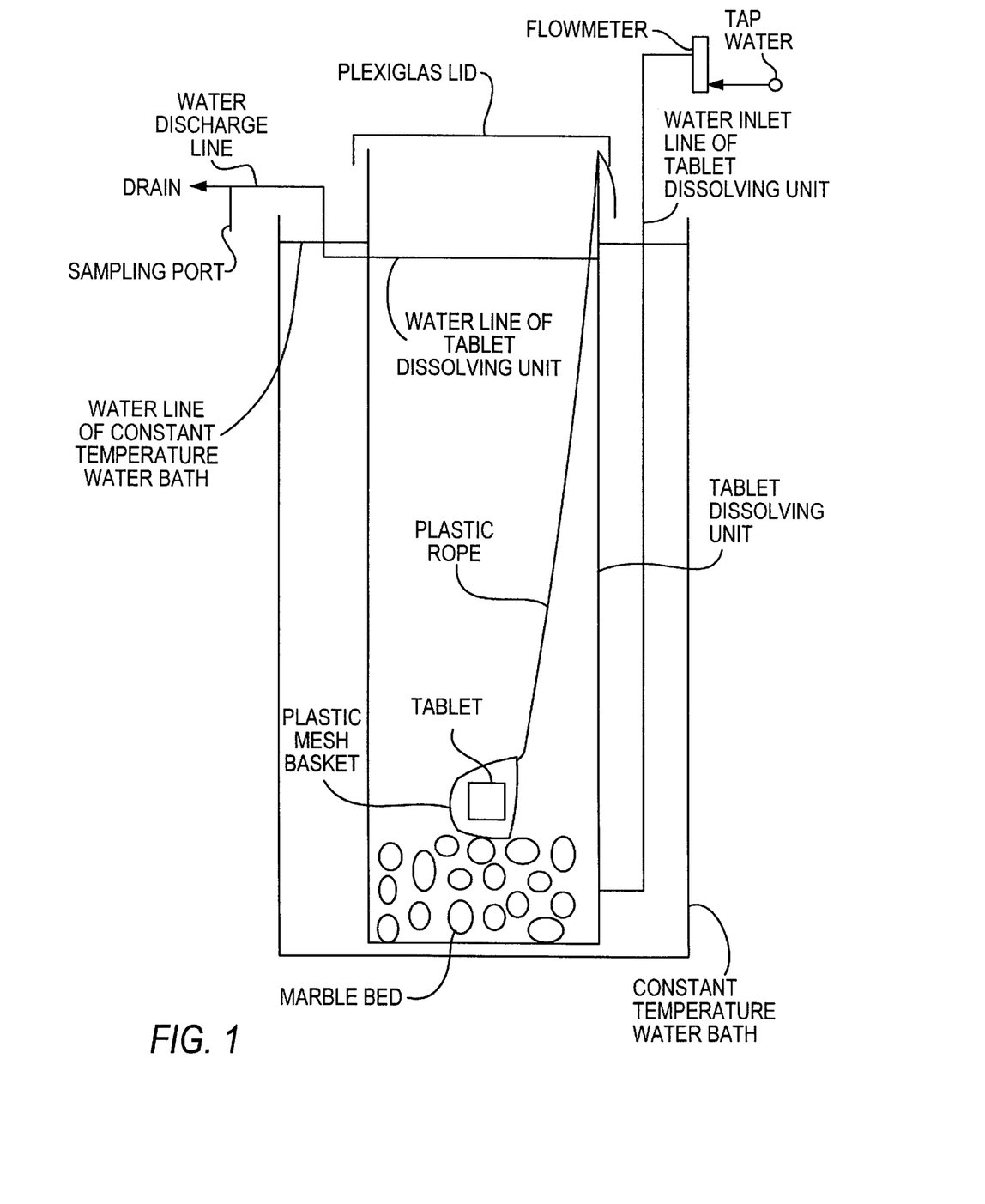
FIG. 1 shows an apparatus used for the determination of steady state dissolving rates of candidate tablet compositions.

The following experimental technique was used to assess the potential of candidate compositions. This was achieved by determining the steady state dissolving rates of tablets of given percent weights of the at least one halogen source and at least one amine compound in the equipment shown in FIG. 1. In each test, a tablet was suspended in water flowing through the unit at a constant temperature (75° F.) and a constant flow rate (75 ml/min). The total available halogen concentration of the water being discharged from the unit was determined every 30 minutes. Samples were taken from the discharge stream water at the sample port and the total chlorine measured with a DPD chlorine test kit. The total available chlorine concentration was recorded as parts per million (ppm) of total available chlorine. The total available chlorine measurements were continued until the first steady state condition was attained in the dissolving unit. The first steady state condition is defined as the point in time where the total available chlorine concentration stopped increasing and remained constant for two hours. At the first steady state condition, the tablet was dissolving in the flowing water at a rate fast enough to replace the available chlorine that was being removed from the unit by the discharge stream.

The following equation was used to determine the first dissolving rate of the tablets:

$$TDR_{ss} = \frac{TAC_{ss} \times A \times F_w \times B}{(AvC/100)}$$

where $TDR_{ss}$=The dissolving rate of the tablet at steady state, milligrams(mg)/min.

$TAC_{ss}$=The total available chlorine of the water in the tablet-dissolving unit at steady state, ppm A=Conversion factor (ppm to milligrams per liter), mg/L/ppm $F_w$=Flow rate of the tap water to the tablet dissolving unit, cc/min (or mL/min)

B=Conversion factor (millimeter to liter), L/ml

AvC=Available chlorine of tablet, % 100=Conversion factor (percent to weight fraction), %

The tablets used to generate the data by this technique weighed 100 grams each and measured approximately 1 inch thick by 2.25 inches diameter. All tablets were made by compacting blends of TCCA and melamine at 30 tons on a laboratory hydraulic press. Magnesium stearate (1 weight percent) was added to each tablet to aid in the compaction of the particles.

Example 4

The following example demonstrates the properties typically observed with TCCA tablets and tablets comprising varying weight percent amounts of TCCA and melamine. The total available chlorine concentration in ppm, the dissolving rate and solution pH levels were determined at the first steady state condition. The results are shown in Table I.

TABLE I

Steady State Dissolving Tests
On Tablets Comprising TCCA and Melamine

| By % weight | Chlorine con. Ppm | Dissolving Rate mg/min | pH of unit water |
|---|---|---|---|
| TCCA 100 | 222 | 18.38 | 7.13 |
| TCCA 90/M 10 | 205 | 19.02 | 6.95 |
| TCCA 85/M 15 | 103 | 10.16 | 7.34 |
| TCCA 80/M 20 | 90.6 | 10.12 | 7.92 |
| TCCA 70/M 30 | 26.3 | 3.13 | 8.95 |
| TCCA 60/M 40 | 6.0 | 0.83 | 9.38 |

As can be seen from the data, after approximately 10 weight percent of melamine was added to the water treatment composition, the dissolving rate significantly decreased and the pH level increased. Thus, the dissolving rates and chlorine concentrations of TCCA can be controlled by the addition of varying percent weight amounts of melamine to the water treatment composition.

Example 5

The following example shows the first steady state dissolving rate of tablets comprising various weight percent amounts of BCEMH and melamine having the same dimensions at the TCCA tablets. The tables were tested under the same conditions as the TCCA/melamine tablets. The chlorine concentrations and dissolving rates were determined at the first steady state condition. The results are summarized in Table II.

TABLE II

Steady State Dissolving Tests
On Tablets Comprising BCEMH and Melamine

| By % weight | Chlorine conc. ppm | Dissolving Rate mg/min |
|---|---|---|
| BCEMH 100 | 75 | 9.992 |
| BCEMH 90/M 10 | 66.7 | 9.200 |
| BCEMH 85/M 15 | 57.6 | 8.420 |
| BCEMH 80/M 20 | 36.3 | 5.630 |
| BCEMH 75/M 25 | 15.4 | 2.550 |
| BCEMH 70/M 30 | 8.5 | 1.490 |

As can be seen by the test results, the steady state dissolving rates of tablets made from BCEMH and melamine decreased from about 9.99 to 1.49 mg/min as the melamine content of the water treatment composition increased from 0 to 30 wt %. These results demonstrate that the dissolving rate of BCEMH tablets can be customized to produce tablets with dissolving rates lower than tablets comprising BCEMH alone, by adding melamine in varying percent weights.

Example 6

Figure 2:
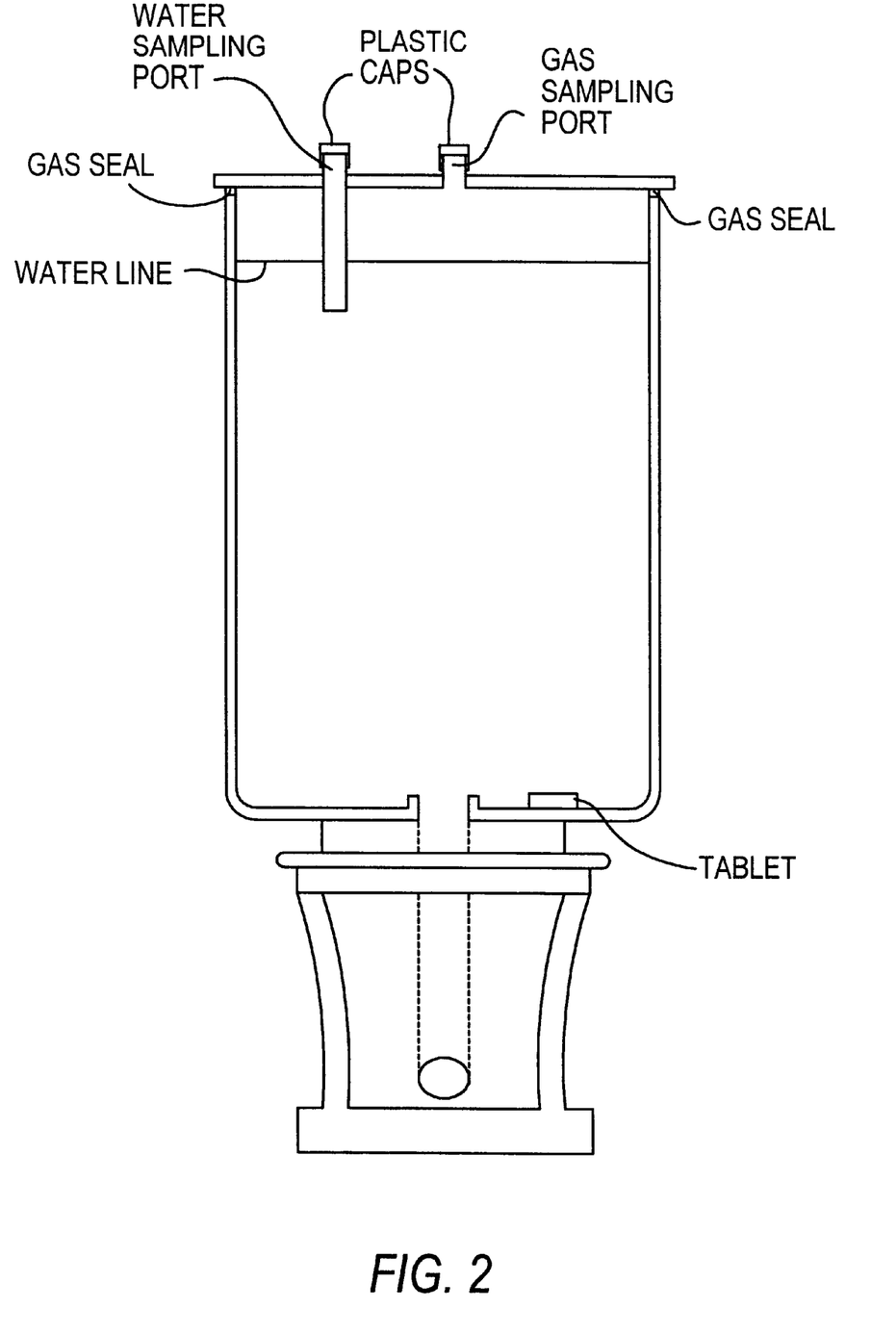
FIG. 2 shows the toilet apparatus used in the toilet flush system test.

A toilet flushing test was utilized to evaluate the average dissolving rate, the effect on the chemistry of the water and the chlorine content of the air over the water of the toilets treated with the water treatment composition tablets of the present invention and BCEMH tablets. Each test consisted of placing two tablets of the water treatment composition in one toilet and two tablets BCEMH in another toilet. FIG. 2 is a schematic of the toilet design. As shown, both toilets were connected to a common source of tap water so that the temperature and the chemistry of the water were the same for each toilet. Each water line was equipped with a solenoid valve that could be opened and closed at a predetermined frequency and duration by a programmable actuator. The toilets were flushed every 30 seconds for 16 hours (2,000 flushes per 16 hours). The flush cycles were then suspended for 8 hours. The tank of each toilet was equipped with two ports. One port was used to determine the chlorine content of the air in the headspace of each toilet could be determined during each suspended flush cycle. The other port was used to obtain samples of the water in each toilet tank near the end of each suspended flush cycle.

The chlorine content of the air of the head space of each tank was determined with Gastec Passive Dosimeter Tubes For Chlorine, which were inserted through a rubber stopper in each gas sampling port, at the fourth hour of the suspended flush cycle. The tubes were removed before the end of the seventh hour of the suspended flush cycle. The chlorine reading in ppm was divided by the number of hours the dosimeter tube was left in the gas sampling port.

Water samples were taken from each toilet tank after the chlorine gas sampling tubes were removed. The pH and the total available chlorine concentration were then determined. The pH was determined with a standard laboratory pH meter. The total available chlorine concentration was determined by the same method described above.

The tablets were removed at the 7$^{th}$ hour, carefully patted with absorbent paper towels to remove excess moisture and weighed. The tablets were repositioned in the respective toilets just before the 16$^{th}$ hour flush cycle was re-initiated.

The average dissolving rate of each tablet was determined by the formula shown below:

$$TDR_{TFT}=(W_1-W_2)/TC$$

where,

TDR$_{TFT}$=average dissolving rate of tablet for time, T, grams/hour

W$_1$=weight of tablet at start of toilet flushing test, grams

W$_2$=weight of tablet at time, T, grams

T=time, days

C=conversion factor, 24 hours/day

Note, two tablets of each composition were typically used in a toilet flushing test. Thus, the average dissolving rate for two tablets can be calculated by adding the average dissolving rates of each tablet and dividing by two.

In the following examples, BCEMH tablets were used as the reference composition in each test. The dimensions, the shape and the weights of the BCEMH tablets and the water treatment compositions of the present invention were essentially the same in each test.

Example 7

Data were generated to compare the average dissolving rates for TCCA tablets with those of the bromine product referred to as BCEMH tablets under the conditions described above in EXAMPLE 4. The water temperature was 58–66° F. during the test. The data showed that the TCCA tablets dissolved faster than the BCEMH tablets. For example, the weights of TCCA tablets decreased from 99.9 and 100.1 to 36.9 and 36.3 grams, respectively over a period of 11 days. The average dissolving rate of each TCCA tablet under these test conditions were calculated to be 0.239 and 0.242 gram/hour, respectively. The average dissolving rate of the two TCCA tablets was determined to be 0.241 gram/hour. The data also show that the weights of the BCEMH tablets decreased from 100 and 99.9 to 62.3 and 55.2 grams, respectively. The average dissolving rate of each tablet was determined to be 0.142 and 0.169 gram/hour. Thus, the average dissolving rate of the two tablets was 0.156 gram/hour.

The total available chlorine concentration in the toilet water treated with TCCA tablets was found to decrease from 75 to 29.2 ppm during the test. For the BCEMH tablets, the total available halogen concentration (as available chlorine) ranged from 8.3 to 16.7 ppm.

The chlorine concentration in the air inside the toilet tank above the water treated with the TCCA tablets was determined to be 2.9 ppm after one day. Although it decreased to zero by the next day, a strong chloramine odor was present in the toilet flushing test room throughout the test. Also, the chloramine odor was overpowering when the TCCA tablets were removed each day for weighing. Chlorine was not detected by the Gastec Passive Dosimeter Tubes in head space of the toilet tank containing the BCEMH tablets.

The pH of the water treated with TCCA tablets ranged from 7.28 to 8.70, whereas it ranged from 8.69 to 9.60 in the water treated with the BCEMH tablets.

Example 8

Figure 3:
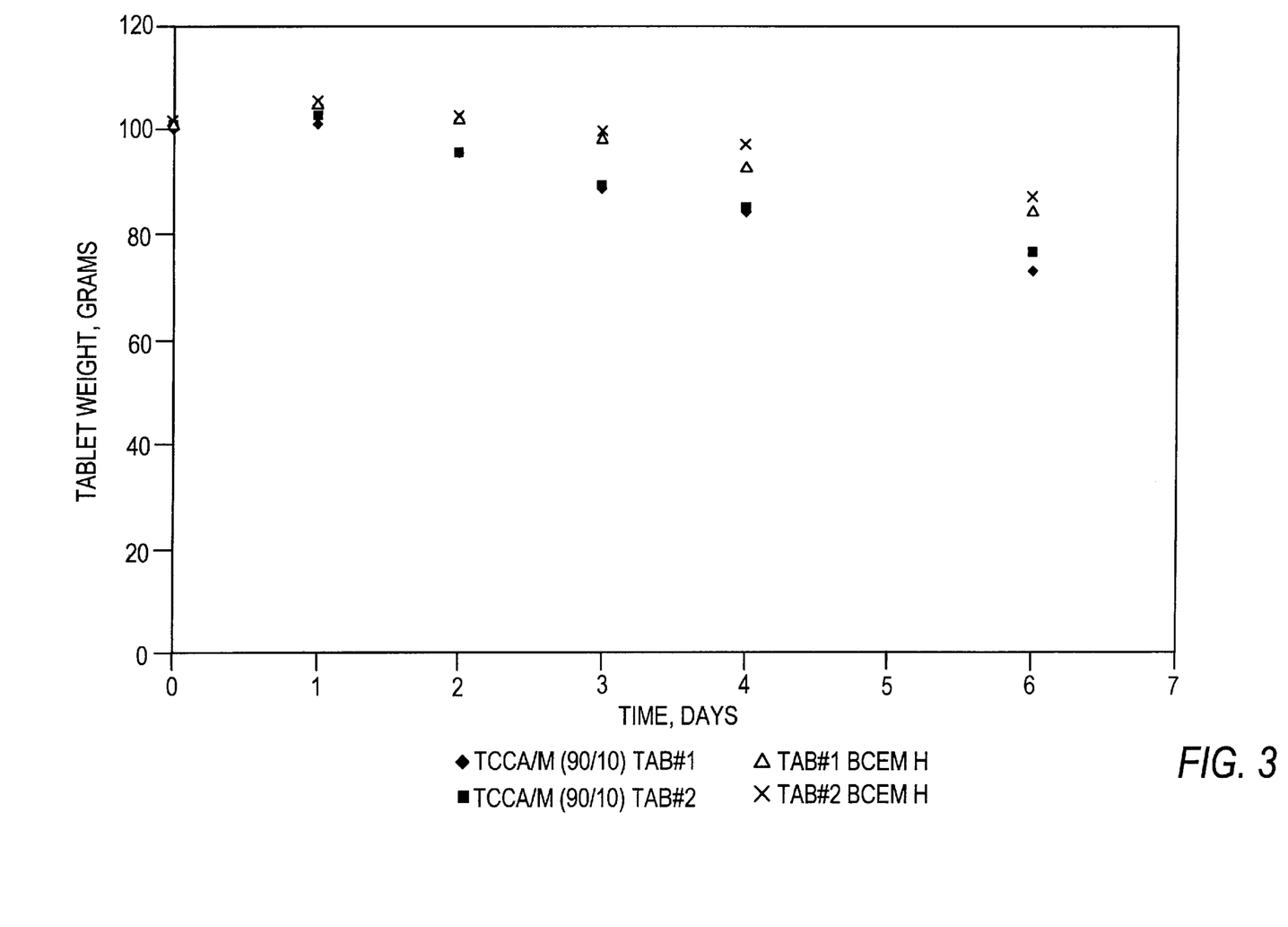
FIG. 3 shows the decrease in weights for the composition of the invention comprising 10% by weight melamine and 90% by weight TCCA and BCEMH tablets during a toilet flush test.

Data were generated to obtain a comparison between the average dissolving rates for TCCA/melamine (90/10% weight) water treatment composition tablets and reference BCEMH tablets under the conditions described above. The water temperature during the run was 45–48° F. FIG. 3 shows the decrease in weights of both types of tablets with time. The data show that the TCCA/melamine tablets dissolved faster than the BCEMH tablets. For example, the weights of the TCCA/melamine tablets decreased from 100.4 and 100.7 to 73.1 and 76.2 grams, respectively over a period of 8 days. The average dissolving rate of the tablets was calculated to be 0.17986 grams/hour. The data also showed that the weights of the BCEMH tablets decreased from 101.5 and 101.6 to 84.3 and 86.8 grams, respectively over the same period and conditions. The average dissolving rate of the two tablets was calculated to 0.1111 grams/hour.

The total available chlorine concentration in the TCCA/melamine water treatment composition toilet water was found to decrease from 33.3 to 29.2 ppm during the test. For BCEMH tablets, the total available chlorine in the water fluctuated between 18.7 and 20.8 ppm.

The pH of waters in the toilet tanks, ranged between 8.59 and 9.27 for the TCCA/melamine tablets and between 8.30 and 9.32 for the BCEMH tablets.

Example 9

Figure 4:
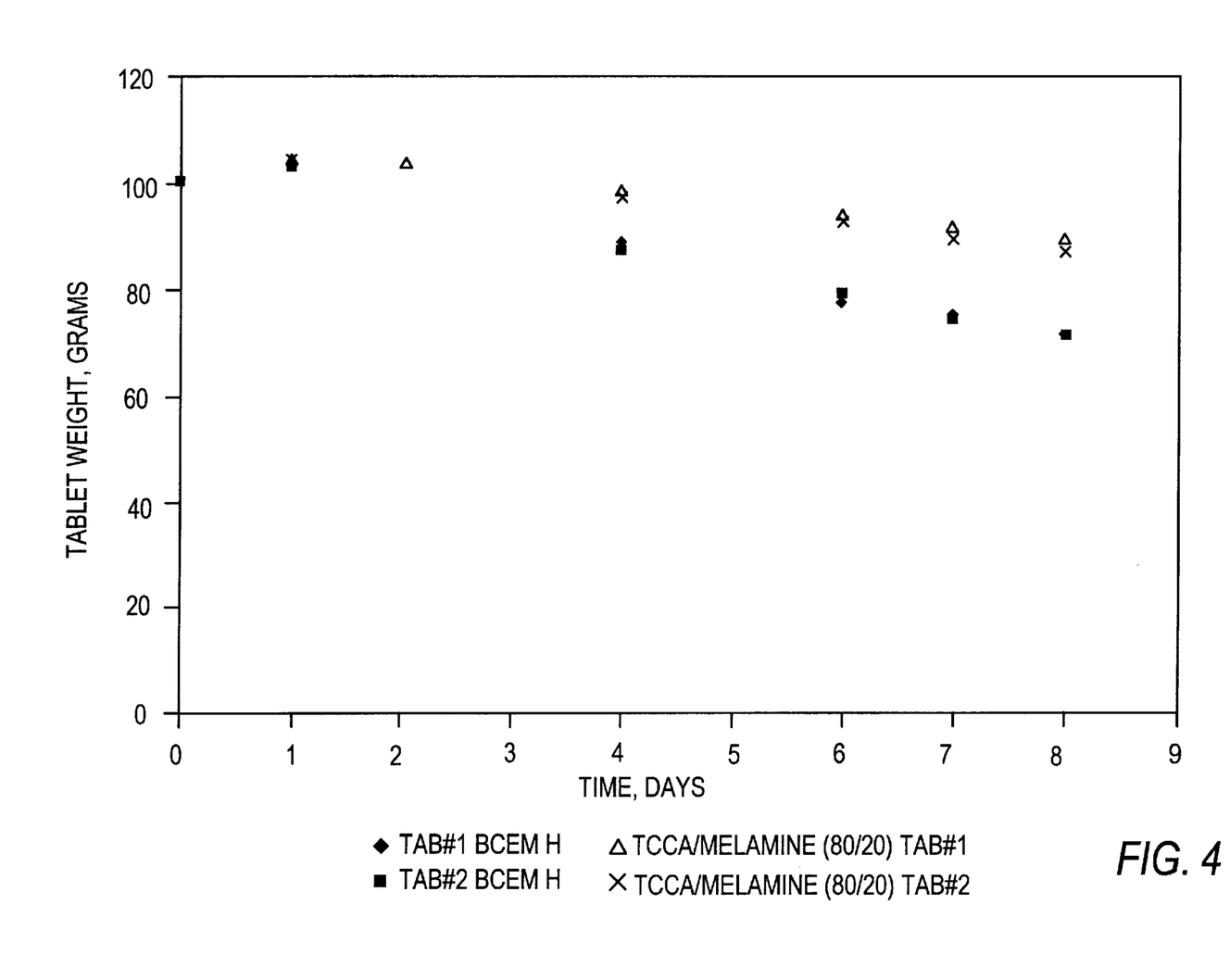
FIG. 4 shows the decrease in weights for the composition of the invention comprising 20% by weight melamine and 80% by weight TCCA and BCEMH tablets during a toilet flush test.

The following example shows that the dissolving rate of TCCA/melamine tablets could be made to dissolve slower than BCEMH tablets by increasing the melamine content of the TCCA/melamine compositions. The TCCA/melamine (80/20% weight) water treatment composition tablets were compared to BCEMH tablets. The water temperature during the test was 42–46° F. The test data shown in FIG. 4 show that the tablet weights of the TCCA/melamine tablets decreased from 100.5 and 100.4 to 88.2 and 86.1 grams, respectively during 8 days of the test. The average dissolving rate of the tablets was calculated to be 0.0696 gram/hr.

The BCEMH tablet weights decreased from 100.6 and 100.0 to 70.6 and 70.4 grams, respectively. The average dissolving rate of the BCEMH tablets was calculated to be 0.156 gram/hr.

The pH of the water in the toilet tank containing the TCCA/melamine tablets varied between 9.06 and 9.37 over 8 days of the test. The pH of water in the toilet tank containing the BCEMH tablets fluctuated between 10.0 and 9.52. The total available chlorine concentration in the water of the toilet tank containing the TCCA/melamine tablets fluctuated from 21.9 to 29.2 ppm during the test. The BCEMH tablets provide total available chlorine between 18.8 and 20.4 ppm during the test. No chlorine was detected in the headspace of either toilet tank.

Example 10

Figure 5:
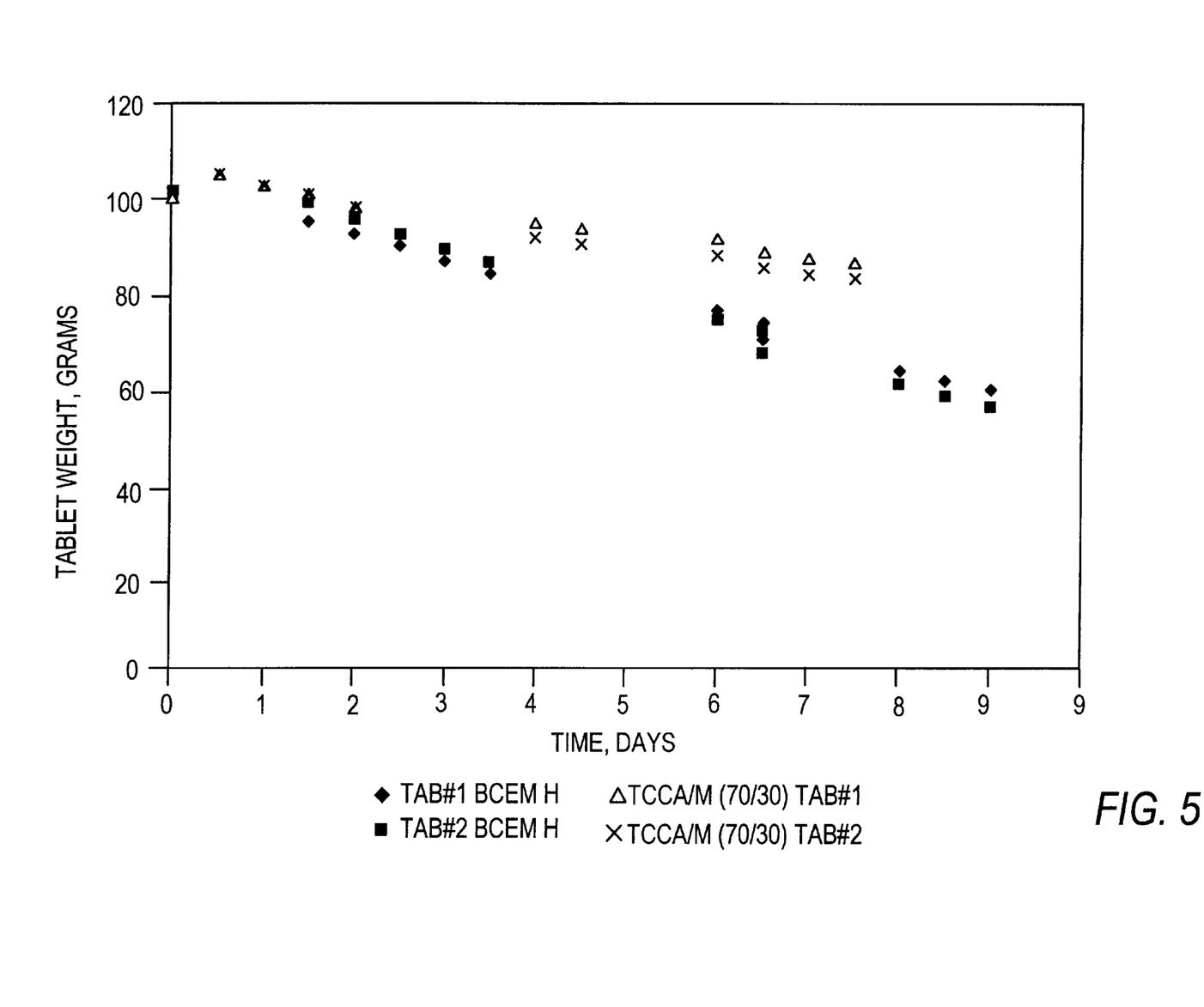
FIG. 5 shows the decrease in weights for the composition of the invention comprising 30% by weight melamine and 70% by weight TCCA and BCEMH tablets during a toilet flush test.

Data were generated that showed that the dissolving rate of TCCA/melamine tablets could be made to dissolve considerably slower than either the BCEMH or the 80/20 weight percent TCCA/melamine tablets by increasing the melamine content of the TCCA/melamine tablets to 30 percent weight. The water temperature during the test was 38–41° F. The data in FIG. 5 shows that the TCCA/melamine (70/30% weight) tablets dissolved slower than the BCEMH tablets under the same test conditions.

The test data showed that the tablet weights of these TCCA/melamine tablets decreased from 100.6 and 100.4 to 86.6 and 83.2 grams, respectively during 19 days of the test. The average dissolving rate of the tablets was calculated to be 0.0684 grams/hr.

The BCEMH tablet weights decreased from 102.3 and 100.4 to 60 and 56.7 grams, respectively. The average dissolving rate of the tablets was calculated to be 0.0963 grams/hr.

The pH of the water in the toilet tank containing the TCCA/melamine tablets varied between 7.75 and 9.96 over 19 days of the test. The 7.75 reading was observed in the second day of the test. The pH remained above 9 after the second day. The pH of water in the toilet tank containing the BCEMH tablets fluctuated between 8.11 and 9.54.

The total available chlorine concentration in the water of the toilet tank containing the TCCA/melamine (70/30% weight) tablets decreased from 54 to 14.5 ppm in the first 4 days the test. After that, it fluctuated from 9 to 18.7 ppm. The BCEMH tablet total available chlorine decreased steadily from 33 and 8.7 ppm in the first 4 days and then fluctuated between 9.5 and 32 for the remainder of the test. Chlorine was not detected in the headspaces of either toilet tank.

Example 11

The following example demonstrates that bulking agents may be added to the water treatment composition of the present invention without destroying the structural integrity of the solid form. The addition of other additives must be accomplished without effecting the chemistry between the at least one halogen source and the at least one amine compound. TCCA and melamine were blended together in a sealed glass jar to prevent exposure to humid air. The resulting blend was subdivided and compacted into thin wafers with a diameter of about 1 inch each. The wafers were broken up with a mortar and pistil to form a granulated TCCA/melamine blend.

Other ingredients were mixed and granulated separately from the TCCA/melamine blend. Calcium sulfate and magnesium stearate were mixed and granulated as described above. The calcium sulfate blend was then mixed with the TCCA/melamine blend and compacted into the tablets used in the following examples. This process maximizes the potential of stoichiometrical reaction between the melamine and the TCCA and is readily adapted to commercial practice.

Example 12

Calcium sulfate was added to TCCA/melamine compositions in increments of 5% and steady state dissolving rates were determined by the technique described in EXAMPLE 1. The TCCA/melamine mole ratio was maintained at approximately 3.802 in all experiments. Table III summarizes the experimental results. All ingredient amounts are in percent weights.

TABLE III

Steady State Dissolving Rates of Tablets Comprising TCCA, Melamine and Additional Ingredients

| Dissolving Rate Mg/min | Available Chlorine ppm | TCCA | Melamine | Calcium Sulfate | Magnesium Stearate |
|---|---|---|---|---|---|
| 17.43 | 167.5 | 85.55 | 11.79 | 4.71 | 0.94 |
| 17.57 | 165 | 78.83 | 11.26 | 9.01 | 0.90 |
| 18.09 | 165 | 75.43 | 10.78 | 12.93 | 0.86 |
| 18.09 | 165 | 72.31 | 10.33 | 16.53 | 0.86 |
| 13.04 | 109.5 | 69.44 | 9.92 | 19.84 | 0.80 |

The solid form maintained its structural integrity throughout the experiments. As can be seen from the data, the dissolving rate of the water treatment compositions of the present invention can be further customized by the addition of varying amounts of metal salts such as calcium sulfate. The solid water treatment compositions of the present invention can be economically formulated by including calcium sulfate or similar bulking agents in the solid water treatment compositions of the present invention.

Example 13

Data were generated to compare the average dissolving rates for TCCA tablets with those of tablets comprising about 75.43 wt % TCCA, 10.78 wt % melamine, 12.93 wt % calcium sulfate and 0.86 wt % magnesium stearate under the conditions described above in EXAMPLE 4. FIG. 6 shows the decrease in weights of both types of tablets with time under the test conditions. The water temperature was 64–67° F. during the test. The data show that the TCCA tablets dissolved faster than the TCCA/melamine tablets. For example, the weights of TCCA tablets decreased from 100.1 and 99.9 to 72.3 and 70.9 grams, respectively over a 6 day period. The average dissolving rate of each TCCA tablet under these test conditions were calculated to be 0.193 and 0.201 grams/hour, respectively. The average dissolving rate of the two tablets was determined to be 0.197 gram/hour. The data also show that the weights of the TCCA/melamine tablets decreased from 99.4 and 99.6 to 85.0 and 78.8 grams, respectively. The average dissolving rate of each tablet was determined to be 0.100 and 0.1444 gram/hour. Thus, the average dissolving rate of the two tablets was 0.1222 gram/hour.

The total available chlorine concentration in the toilet water treated with TCCA tablets was found to decrease from 75 to 8.5 ppm during the test. For the TCCA/melamine tablets, the total available halogen concentration (as available chlorine) decreased from 70.8 and 12.5 ppm during the run.

The chlorine concentration in the air inside the toilet tank above the water treated with the TCCA tablets was determined to be 7.5 ppm after one day. It decreased to 1.4 ppm over the next 5 days. A strong chloramine odor was present in the toilet flushing test room. The odor became overpowering when the TCCA tablets were removed each day for weighing. No chlorine was detected by the Gastec Passive Dosimeter Tubes in head space of the toilet tank containing the TCCA/melamine tablets.

Example 14

A tablet of solid water treatment composition comprising 79.20% weight TCCA, 19.80% weight melamine and 0.99% weight magnesium stearate was immersed in water for 4 hours. The composition was removed from the water and a color change on the surface layer of the tablet was observed. A sample of one of the surfaces of the tablet was obtained by carefully removing a portion of the surface layer. The sample was placed in a Petri dish and dried in an oven for one hour at 100° C. The dried material was placed in an airtight bottle until it was subjected to mass spectra analyses. FT-IR analysis was also conducted to screen compounds for functional groups.

A portion of the material was dissolved in a 50/50 mixture of reagent grade 1-pentanol and reagent grade methanol. The resulting solution was subjected to mass spectra analysis with a Varian Tandem Quadropole Engine having a mass range of 1 to 850 atomic mass units (amu). The solution was scanned in the mass range of 10–400 amu. The mass spectra was then compared to the characteristics of trichloromelamine. The results indicated that the characteristics of the ions of the material obtained from the solid water treatment composition of the invention after water immersion were essentially the same as trichloromelamine (99.96% certainty). The solution was then subjected to a SIM mode analysis which also matched trichloromelamine. The melting point of the material was 322.7° C., the same as trichloromelamine.

Samples of melamine and TCCA also were separately subjected to mass spectra analysis and melting point determination. The mass spectra of melamine and TCCA were nearly identical to their respective mass spectra listed in the Merck MS library. The melting point of melamine was determined to be 341° C. and the melting point of TCCA was determined to be 232.9° C. The results of the mass spectra analyses clearly showed halamine was formed on or near the surface layer of the solid water treatment composition after the composition was immersed in water. The results further indicate that the reaction did not occur in the interior of the solid water treatment composition.

A sample was taken from the interior portion of the solid water treatment composition and subjected to the same mass spectra analyses as described above. The results of the analyses indicated that the material was essentially identical to a mixture of TCCA and melamine. The solution was subjected to a SIM mode analysis which demonstrated that the ion species matched those of TCCA and melamine.

The present invention is not to be construed as limited in scope to the specific embodiments described herein. Indeed, various modifications of the invention in addition to those described herein will become apparent to those skilled in the art from the foregoing description and accompanying figures. Such modifications are intended to fall within the scope of the appended claims.

I claim:

1. A solid water treatment composition comprising at least one halogen source, at least one amine compound, and a tabletting additive, wherein said at least one halogen source comprises from about 1% to 85% by weight, said at least one amine compound comprises from about 1% to 60% by weight and said at least one tabletting additive comprises from about 5% to 90% by weight of said solid water treatment composition.

2. The solid water treatment composition of claim 1 comprising at least one halogen source, at least one amine compound, and a tabletting additive, wherein said at least one halogen source comprises from about 1% to about 10% by weight, the at least one amine compound comprises from about 1% to about 10% by weight and the at least one tabletting additive comprises about 90% by weight of said solid water treatment composition.

3. The solid water treatment composition of claim 1 comprising at least one halogen source and at least one amine compound wherein said halogen source comprises about 60% by weight 1-bromo-3-chloro-dimethyl hydantoin, about 30% by weight 1,3 dichloro 5,5 dimethyl hydantoin and about 10% by weight 1,3-dichloro-5-ethyl, 5-methyl hydantoin based on the weight of the at least one halogen source.

4. A solid water treatment composition comprising at least one halogen source, at least one amine, and calcium sulfate.

5. The solid water treatment composition of claim 1 comprising about 70% by weight trichloroisocyanuric acid, about 10% by weight melamine and about 20% calcium sulfate, based on the weight of said solid water treatment composition.

6. A method of producing a solid water treatment composition comprising admixing at least one halogen source and at least one amine compound wherein said at least one halogen source composition from about 1% to about 85% by weight, said at least one amine compound comprises from about 1% to about 60% by weight and said tabletting additive comprises from about 5% to about 90% by weight based on the weight of said solid water treatment composition.

7. The method of claim of claim 6, wherein said at least one halogen source composition comprises about 70% by weight, said at least one amine compound comprises about 10% by weight and said tabletting additive comprises about 20% by weight of solid water treatment composition based on the weight of said solid water treatment composition.

8. The method of producing a solid water treatment of claim 6 composition comprising admixing at least one halogen source and at least one amine compound wherein the at least one halogen source comprised from 1% to 10% by weight, the at least one amine compound comprises from 1% to 10% by weight and the tabletting additive comprises about 90% by weight based on the weight of said solid water treatment composition.

9. The method of claim 6 wherein said halogen source comprises about 60% by weight 1-bromo-3-chloro-dimethyl hydantoin, about 30% by weight dichloro-dimethyl hydantoin and about 10% by weight 1,3-dichloro-5-ethyl, 5-methyl hydantoin.

10. A method of producing a solid water treatment composition comprising admixing at least one halogen source, at least one amine and calcium sulfate.

11. The method of claim 10 wherein said halogen source comprises about 70% by weight trichloroisocyanuric acid, said at least one amine compound comprises about 10% by weight melamine and said tabletting additive comprises about 20% calcium sulfate.

12. The method of claim 6 wherein the admixture comprises particles, wherein the particles are about 99% greater than 60 mesh and about 1% no greater than 12 mesh.

13. The method of claim 6 further comprising:
providing a first portion comprising the at least one halogen source and the at least one amine compound;
providing a second portion comprising the at least one tabletting additive;
combining said first portion and said second portion;
applying pressure to said first portion and said second portion in an amount effective to form a flat solid composition; and
breaking said flat solid composition into particles having a particle distribution about 99% greater than 60 mesh and about 1% no greater than 12 mesh.

14. The method of 13 wherein said admixture is compressed into a compacted tablet by applying an effective amount of pressure.

15. A method of disinfecting and controlling biofouling of a water system comprising introducing into the water a solid water treatment composition wherein the solid water treatment comprises at least one halogen source, at least one amine compound, and a tabletting additive, wherein said at least one halogen source comprises from about 1% to about 85% by weight, said at least one amine compound comprises from about 1% to about 60% by weight and said at least one tabletting additive comprises about 5% to about 90% by weight of said solid water treatment composition.

16. The method of disinfecting and controlling biofouling of a water system of claim 15 wherein said at least one halogen source wherein the at least one halogen source comprises from about 1% to about 10% by weight, the at least one amine compound comprises from about 1% to about 10% by weight and the at least one tabletting additive comprises about 90% by weight of said solid water treatment composition.

17. The method of disinfecting and controlling biofouling of claim 15 wherein the solid water treatment comprises about 70% by weight trichloroisocyanuric acid, about 10% by weight melamine and about 20% calcium sulfate, based on the weight of said solid water treatment composition.

18. A solid water treatment composition comprising at least one halogen source and at least one amine compound wherein said halogen source comprises 1-bromo-3-chloro-dimethylhydantoin, 1,3-dichloro-5,5-dimethylhydantoin and 1,3 dichloro-5-ethyl-5-methyl hydantoin.

19. A solid water treatment composition comprising trichloroisocyanuruic acid, melamine and calcium sulfate.

20. A method of producing a solid water treatment composition comprising admixing at least one halogen source and at least one amine compound wherein said halogen source comprises 1-bromo-3-chloro-dimethylhydantoin, 1,3-dichloro-5,5-dimethylhydantoin and 1,3-dichloro-5-ethyl-5-methylhydantoin.

21. A method of producing a solid water treatment composition comprising admixing trichloroisocyanuruic acid, melamine and calcium sulfate.

22. A method of disinfecting and controlling biofouling of a water system comprising contacting the water of a water system with an effective amount of solid water treatment composition comprising 1-bromo-3-chloro-dimethylhydantoin, 1,3-dichloro-5,5-dimethylhydantoin and 1,3-dichloro-5-ethyl-5-methylhydantoin.

23. A method of disinfecting and controlling biofouling of a water system comprising contacting the water of a water system an effective amount of solid water treatment composition comprising trichloroisocyanuruic acid, melamine and calcium sulfate.

24. A solid water treatment composition comprising at least one halogen source and melamine, wherein the halogen source comprises chlorine.

25. The solid water treatment of claim 24, wherein the at least one halogen source is a member selected from the group consisting of trichloroisocyanuric acid, dichloroisocyanuric acid, monochloroisocyanuric acid, potassium dichloroisocyanuric acid, anhydrous sodium dichloroisocyanuric acid, sodium dichloroisocyanuric dihydrate, 1,3-dichloro-5,5-dimethyl-hydantoin, 1,3-dichloro-5-methyl-5-ethylhydantoin, trichloromelamine, dichloromelamine, monochloromelamine, hexachloromelamine, tribromomelamine, calcium hypochlorite, lithium hypochlorite, and combinations thereof.

26. The solid water treatment of claim 24, wherein the at least one halogen source is trichloroisocyanuric acid.

27. The solid water treatment of claim 24, wherein the at least one halogen source is selected from the group consisting of a composition comprising sodium bromide and a chlorine, a composition comprising potassium bromide and chlorine, a composition comprising a metal bromide and chlorine, and a composition comprising trichloroisocyanuric acid and potassium bromide.

28. A method of producing a solid water treatment composition comprising admixing at least one halogen source and melamine, wherein the halogen source comprises chlorine.

29. The method of claim 28 wherein the at least one halogen source is a member selected from the group consisting of trichloroisocyanuric acid, dichloroisocyanuric acid, monochloroisocyanuric acid, potassium dichloroisocyanuric acid, anhydrous sodium dichloroisocyanuric acid, sodium dichloroisocyanuric dihydrate, bromochloroisocyanuric acid derivatives, 1,3-dichloro-5,5-dimethyl-hydantoin, 1,3-dichloro-5-methyl-5-ethylhydantoin, trichloromelamine, dichloromelamine, monochloromelamine, hexachloromelamine, calcium hypochlorite, lithium hypochlorite, and combinations thereof.

30. The method of claim 28 wherein the at least one halogen source is trichloroisocyanuric acid.

31. The method of claim 28 wherein the at least one halogen source is selected from the group consisting of a composition comprising sodium bromide and a chlorine, a composition comprising potassium bromide and chlorine, a composition comprising a metal bromide and chlorine, and a composition comprising trichloroisocyanuric acid and potassium bromide.

32. A method of disinfecting and controlling biofouling of a water system comprising introducing into the water a solid water treatment composition wherein the solid water treatment composition comprises at least one halogen source and melamine, wherein the halogen source comprises chlorine.

33. The method of claim 32 wherein the at least one halogen source is a member selected from the group consisting of trichloroisocyanuric acid, dichloroisocyanuric acid, monochloroisocyanuric acid, potassium dichloroisocyanuric acid, anhydrous sodium dichloroisocyanuric acid, sodium dichloroisocyanuric dihydrate, bromochloroisocyanuric acid derivatives, 1,3-dichloro-5,5-dimethyl-hydantoin, 1,3-dichloro-5-methyl-5-ethylhydantoin, trichloromelamine, dichloromelamine, monochloromelamine, hexachloromelamine, calcium hypochlorite, lithium hypochlorite, and combinations thereof.

34. The method of claim 32 wherein the at least one halogen source is trichloroisocyanuric acid.

35. The method of claim 32 wherein the at least one halogen source is selected from the group consisting of a composition comprising sodium bromide and a chlorine, a composition comprising potassium bromide and chlorine, a composition comprising a metal bromide and chlorine, and a composition comprising trichloroisocyanuric acid and potassium bromide.

\* \* \* \* \*